(12) United States Patent
Frank

(10) Patent No.: US 8,496,419 B2
(45) Date of Patent: Jul. 30, 2013

(54) BLIND RIVET

(75) Inventor: Uwe Frank, Windischenbach (DE)

(73) Assignee: Wuerth International AG, Chur (CH)

( * ) Notice: Subject to any disclaimer, the term of this patent is extended or adjusted under 35 U.S.C. 154(b) by 273 days.

(21) Appl. No.: 12/674,005

(22) PCT Filed: Aug. 18, 2008

(86) PCT No.: PCT/EP2008/006766
§ 371 (c)(1),
(2), (4) Date: Feb. 18, 2010

(87) PCT Pub. No.: WO2009/024311
PCT Pub. Date: Feb. 26, 2009

(65) Prior Publication Data
US 2011/0217140 A1 Sep. 8, 2011

(30) Foreign Application Priority Data
Aug. 20, 2007 (DE) .......................... 10 2007 040 371

(51) Int. Cl.
*F16B 21/16* (2006.01)
(52) U.S. Cl.
USPC .......................................... 411/34; 29/524.1
(58) Field of Classification Search
USPC ........ 411/34, 38, 43, 45, 46, 47, 48; 29/524.1
See application file for complete search history.

(56) References Cited

U.S. PATENT DOCUMENTS

| | | | |
|---|---|---|---|
| 2,248,755 A * | 7/1941 | Hathorn | 411/15 |
| 2,403,592 A | 7/1946 | Fisk | |
| 3,136,203 A * | 6/1964 | Davis | 411/38 |
| 3,178,989 A * | 4/1965 | Siebol | 411/38 |
| 3,403,593 A * | 10/1968 | Moore | 411/29 |
| 3,691,924 A * | 9/1972 | Baker | 411/30 |
| 3,948,142 A * | 4/1976 | McKay et al. | 411/38 |
| 4,036,098 A | 7/1977 | Schruff | |
| 4,089,099 A | 5/1978 | Nivet | |
| 4,875,815 A * | 10/1989 | Phillips, II | 411/38 |
| 4,987,714 A | 1/1991 | Lemke | |
| 5,025,128 A | 6/1991 | Derbyshire | |
| 5,051,048 A * | 9/1991 | Maddox | 411/34 |
| 5,248,231 A * | 9/1993 | Denham et al. | 411/43 |
| 5,259,713 A * | 11/1993 | Renner et al. | 411/34 |
| 5,645,383 A * | 7/1997 | Williams | 411/43 |
| 5,759,001 A * | 6/1998 | Smith | 411/43 |
| 6,319,258 B1 | 11/2001 | McAllen, III et al. | |
| 6,487,767 B1 * | 12/2002 | Reid et al. | 29/522.1 |

(Continued)

FOREIGN PATENT DOCUMENTS

| | | |
|---|---|---|
| AU | 541854 B2 | 1/1985 |
| DE | 2360159 A1 | 6/1974 |

(Continued)

*Primary Examiner* — Gary Estremsky
(74) *Attorney, Agent, or Firm* — Boyle Fredrickson, S.C.

(57) ABSTRACT

The invention relates to a blind rivet and a rivet pin that is connected or can be connected to the tool and is used to apply the blind rivet. Said rivet pin can be connected, by means of a rivet positioning tool, to a part of the blind rivet designed for said tool. When the blind rivet is inserted into a hole up to the abutment of an abutment shoulder formed on a flange, said contact place can be lengthened by means of the rivet pin acting as a traction element, in order to deform the rivet pin such that it fixes in the opening.

16 Claims, 3 Drawing Sheets

U.S. PATENT DOCUMENTS

| | | | |
|---|---|---|---|
| 6,761,520 B1* | 7/2004 | Dise | 411/38 |
| 6,854,940 B2* | 2/2005 | Jennings et al. | 411/38 |
| 7,077,609 B2* | 7/2006 | Wirth et al. | 411/43 |
| 7,223,056 B2* | 5/2007 | Schneider | 411/183 |
| 7,252,469 B2* | 8/2007 | Zaluzec et al. | 411/34 |
| 2002/0002768 A1* | 1/2002 | Roser | 29/423 |
| 2002/0085895 A1* | 7/2002 | Dehlke | 411/43 |
| 2002/0119025 A1* | 8/2002 | Wirth et al. | 411/43 |
| 2002/0141844 A1* | 10/2002 | Aldama | 411/34 |
| 2002/0154963 A1* | 10/2002 | Jennings et al. | 411/43 |
| 2004/0047704 A1* | 3/2004 | Wirth et al. | 411/43 |
| 2004/0107557 A1* | 6/2004 | Morris et al. | 29/432.2 |
| 2004/0247412 A1* | 12/2004 | Reck et al. | 411/386 |
| 2005/0002760 A1* | 1/2005 | Hayashi et al. | 411/501 |
| 2005/0019136 A1* | 1/2005 | Jones | 411/501 |
| 2005/0123373 A1* | 6/2005 | Hufnagl et al. | 411/43 |
| 2005/0158138 A1* | 7/2005 | Schneider | 411/43 |
| 2005/0201844 A1* | 9/2005 | Davies et al. | 411/34 |
| 2005/0271491 A1* | 12/2005 | Opper | 411/30 |
| 2006/0182512 A1* | 8/2006 | Williams | 411/41 |
| 2006/0251489 A1* | 11/2006 | Denham et al. | 411/34 |
| 2009/0217507 A1* | 9/2009 | Frank et al. | 29/525.06 |
| 2011/0033264 A1* | 2/2011 | Frank | 411/500 |

FOREIGN PATENT DOCUMENTS

| | | |
|---|---|---|
| DE | 2811770 A1 | 9/1978 |
| DE | 3035867 C2 | 4/1981 |
| DE | 4436824 C1 | 4/1996 |
| DE | 10111404 A1 | 9/2002 |
| DE | 102004006344 A1 | 8/2005 |
| EP | 1402974 A | 3/2004 |
| FR | 2246199 A | 4/1975 |
| GB | 645903 A | 11/1950 |
| RU | 2 178 533 C1 | 1/2002 |
| WO | 2004/102015 A1 | 11/2004 |
| WO | 2007/090681 A | 8/2007 |

* cited by examiner

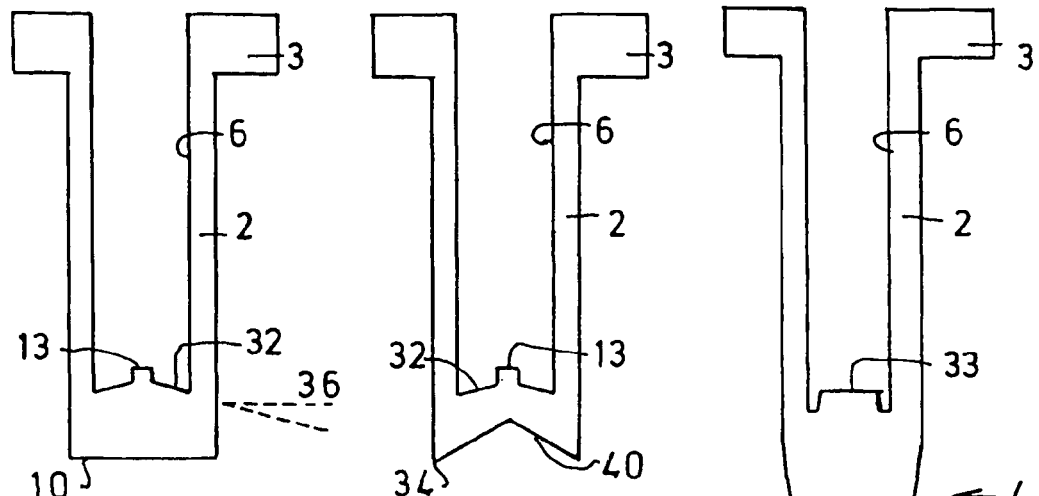
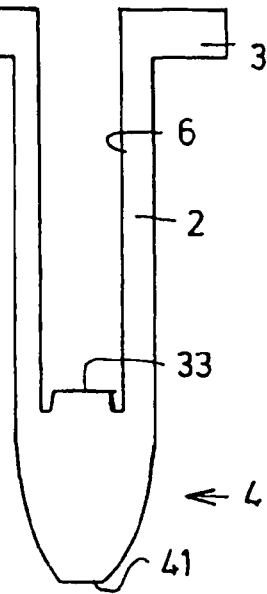
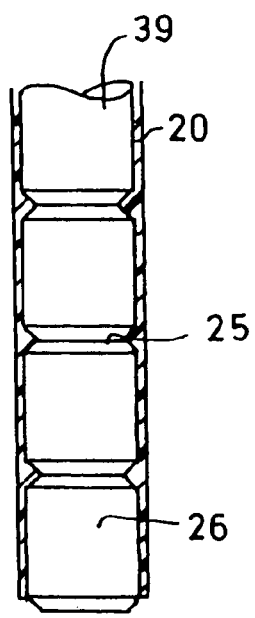
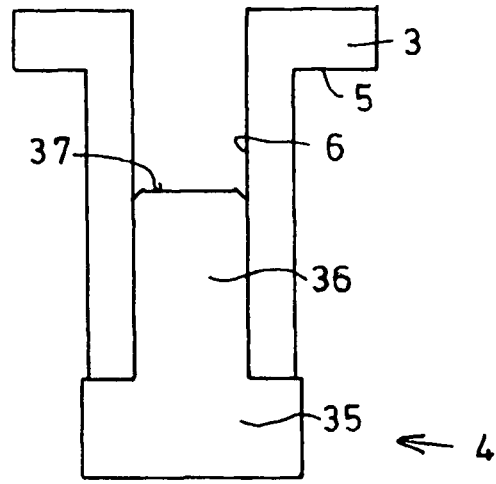
FIG. 12  FIG. 13  FIG. 14
FIG. 11  FIG. 15

BLIND RIVET

TECHNICAL FIELD

The invention relates to a blind rivet and a rivet pin acting as a pull element.

DESCRIPTION OF THE BACKGROUND ART

Blind rivets are known. They serve to fasten things to an element without needing to or being able to handle its reverse side, the blind side. Two parts can be connected, or an element can be fixed, to which something else is fastened.

Blind rivets of this type can be also be used by drilling a hole with a drill beforehand, and the blind rivet is then inserted therein. There are also blind rivets with a drill tip such that the hole is first drilled and then the blind rivet is inserted into this hole in a single step. Procedures are also known where a blind rivet is quickly shot into the sheet metal without pre-drilling. The expansion can be generated by impacting the setting device, or by pulling in the direction opposite that of the setting device. To this end, the blind rivets normally have a pin that is part of the fabricated blind rivet, which is pulled after setting, and the excess part of the rivet pin is discarded.

The invention is based on the problem of further improving the handling of a blind rivet. The invention is also based on the problem of proposing a suitable rivet pin for this purpose.

SUMMARY OF THE INVENTION

The blind rivet proposed by the invention has a contact place that a pull element can contact to deform the front outward, setting the end of the rivet body in a known manner to thereby fix the blind rivet. This pull element is not a part of the blind rivet but rather a separate part that is connected to the rivet body during the setting procedure, for example directly before widening.

One way to design the contact place is for it to have a thread. Then the pull element is screwed into this thread at the beginning, during or after the setting procedure. It is also possible for the thread to be initially formed by the pull element in the process of being connected to it.

Another way to design the contact place for the pull element is for the rivet body to have a contact surface running perpendicular to the lengthwise axis of the rivet body. It can be a defined contact surface or simply the floor of a blind hole. A pull element can be connected here in a wide variety of ways, for example by welding, by adequately strong glues, or by being bonded.

In particular, the contact place for the pull element can be located in a recess of the rivet body, for example when the rivet body is designed as a sleeve.

According to the invention, the front setting end of the blind rivet can be a contiguous part of the rivet body such that the total rivet body only consists of a single part.

The part can however also be a separate part that is then connected to the rivet body.

The front setting end of the blind rivet can have a flat face, for example when the blind rivet is to be inserted in a pre-drilled hole. It has, however, also been shown that it is possible to enclose the front end of a flat-faced blind rivet in sheet metal, etc., which gives the front end an especially sharp edge.

The blind rivet can, however, also have a narrowing tip such as a conical tip, a tip with a curved contour, or a ballistic tip. The front end of the tip can also be flattened or blunt.

If the pull element with the blind rivet is connected by resistance welding or another type of electrically actuated welding, the rivet body according to the invention can have insulation, especially an insulating layer or an insulating sleeve that causes only the front face end of the pull element to contact the corresponding counter-surface.

Such an insulating sleeve preferably consisting of plastic can be designed to connect to an insulating sleeve for one or a plurality of neighboring blind rivets so that said insulating sleeves form a strip that can serve to store a plurality of blind rivets. Such storage can also be useful when the connection between the pull element and the blind rivet is not a weld. In this case as well, a strip can be formed by connected blind rivets which can simplify handling in a tool.

If the connection between the rivet pin and the blind rivet is a weld, the rivet pin can be twisted to shear it off and release the connection after riveting.

An intensified retraction movement can also cause separation when the rivet pin is pulled further after the blind rivet is set.

The rivet pin serving as the pull element can be part of a setting tool that can wear out but in principle remains in the rivet setting tool.

The rivet pin can however also be an expendable element that can be easily changed by the user. In this case, the rivet pin can be easily connected to and released from a setting tool. For example, a rivet setting tool can have a type of chuck similar to a drill chuck for changing the rivet pin.

In particular, the rivet pin can be adjustably arranged in the setting tool.

The rivet setting tool can in particular have a magazine for holding a plurality of blind rivets or a device for holding a magazine of blind rivets.

If the rivet pin is to be screwed to the blind rivet, it can in particular have an outer thread. This outer thread can be only in the area in which the rivet pin engages in the blind rivet, i.e. in its front area.

It is however also possible for the rivet pin to have an outer thread over a greater length so that the rivet pin can be shortened when the outer thread has worn.

If the rivet pin is to be electrically welded, it can have insulation according to the invention at least in its area for engaging in the rivet body of the blind rivet.

The invention provides for the rivet pin to have individual sections separated by rupture joints. After the rivet pin is connected to the blind rivet and after setting, this can serve to disconnect the rivet pin at a location a certain distance from the connecting place between the pin and blind rivet. This can, for example, cause part of the rivet pin to remain in the opening of the blind rivet after setting the blind rivet and removing the rivet pin, which can serve to reinforce the connection created by the blind rivet.

This option of dividing the rivet pin by rupture joints into individual, separate sections can also be useful when the rivet pin is welded to the blind rivet, i.e., when the outside is smooth, as well as when it is screwed to the blind rivet.

Since, as mentioned, the rivet pin can also serve as disposable material when it has individual sections separated by a rupture joints, the invention also proposes a rivet pin as a pull element for setting a blind rivet. When it is intended to be welded, this rivet pin can, for example, have insulation at least in its area intended to engage in the body of a blind rivet.

The invention also proposes a combination of a blind rivet and a rivet pin with the features described herein.

Additional features, details and preferences of the invention are found in both the claims and the abstract (the wording of which is made the content of the description by means of

BRIEF DESCRIPTION OF THE DRAWINGS

FIG. 11 The side view of a rivet pin for welding;

FIG. 12-15 Simplified sections of a blind rivet according to further embodiments of the invention.

DETAILED DESCRIPTION

Figures 1, 2, 3:
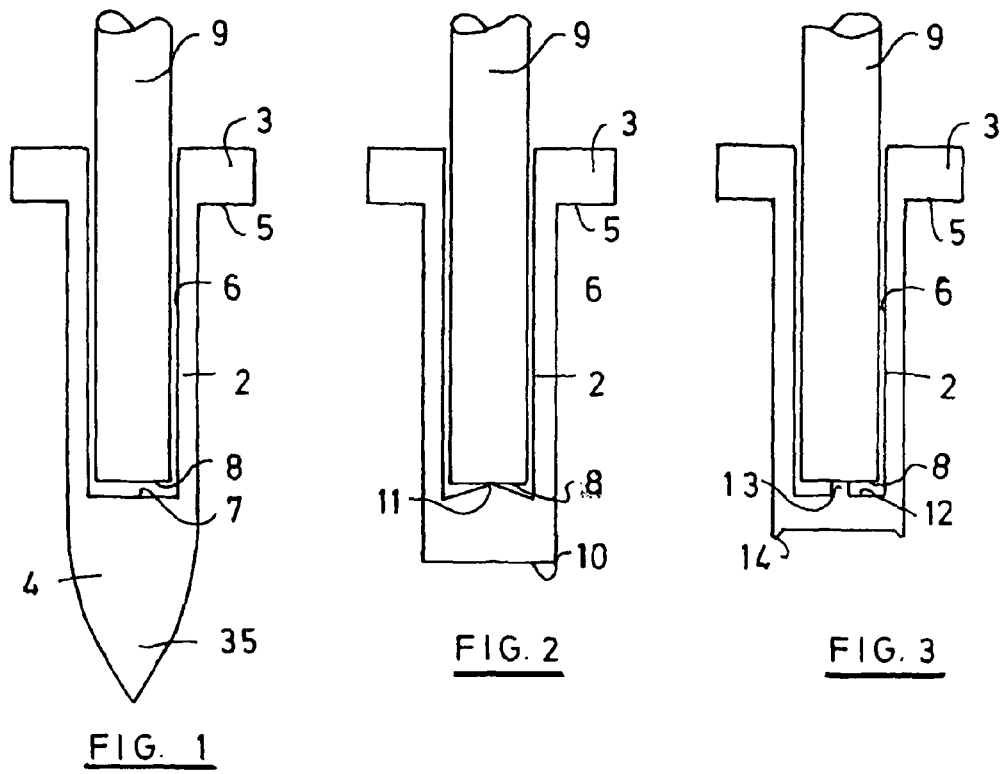
FIG. 1 A schematic section of a blind rivet with a rivet pin.
FIG. 2 A representation corresponding to FIG. 1 of an altered embodiment.
FIG. 3 A section of an embodiment that has again been altered.

To illustrate the invention, FIG. 1 shows a highly simplified example of a blind rivet. On one end, the blind rivet 1 has a rivet body 2 with a flange 3 projecting radially outward, and a front setting end 4 located at the other end of the rivet body 2. The setting end 4 contains a ballistic tip 35. At the side facing the ballistic tip 35 or the front setting end 4, the flange 3 contains a contact surface 5 that lies on a plane which runs perpendicular to the lengthwise axis of the rivet body 2. The rivet body 2 has a blind hole 6 that is delimited by a floor 7. The floor 7 forms a contacts place for the front face end 8 of a rivet pin 9. The rivet pin 9 is designed cylindrically and has an outer diameter that is smaller than the inner diameter of the blind hole 6 of the rivet body 2. It therefore fits in the blind hole 6 at a radial distance. When its face 8 contacts the floor 7 of the blind hole 6, it can be welded to the floor 7 by connecting a source of current. If the rivet pin 9 is then pulled while holding, the flange 3, the front part of the rivet body 2 deforms and thereby forms a rivet head that causes the blind rivet to be fixed in an opening of a piece of sheet metal.

The various Fig. show different types of shapes of setting ends 4 that can, however, all be combined to each other.

FIG. 2 shows an embodiment in which the setting end 4 of the blind rivet does not have a ballistic tip but rather a flat face 10. This blind rivet can, for example, be inserted into a previously drilled opening. It can also be shot or driven in without an existing hole.

A second difference in the embodiment in FIG. 2 is that the floor of the blind hole 6 has a conical shape with an inwardly directed tip 11. This creates a defined contact surface between the tip 11 and the front end 8 of the rivet pin 9. This supports the arc that occurs when welding.

FIG. 3 shows another embodiment in which a cylindrical projection 13 is formed on the floor 12 of the blind hole 6 of the rivet body 2, said projection producing a defined contact surface between the front end 8 of the rivet pin 9 and the blind rivet. This also promotes the formation of the arc occurring while welding. In addition, the face of the setting end 4 is provided with an edge 14 that runs around the perimeter. Such a blind rivet can be shot into sheet-metal with appropriate propulsion, and the projecting edge 14 punches a hole.

The shape of the floor of the different embodiments can be combined as desired with the shape of the setting end 4 in the different embodiments.

Whereas the rivet body 2 is designed as a single piece in the embodiments in FIG. 1-3, FIGS. 4 and 5 show an embodiment in which the insertion end 4 is designed as a separate component 15 that engages with a shaft 16 in the rivet body 2' designed as a sleeve. A contact place 17 is thereby formed at the end of the shaft 16 that can be contacted by a rivet pin in the same manner as in the embodiments in FIG. 1-3. This contact place 17 is closer to the contact surface 5 of the flange 3 which, however, is not a problem, since the actual force serving to expand the blind rivet is exerted on the rivet body 2' by a shoulder 18 of the separate component 15.

Figures 4, 5:
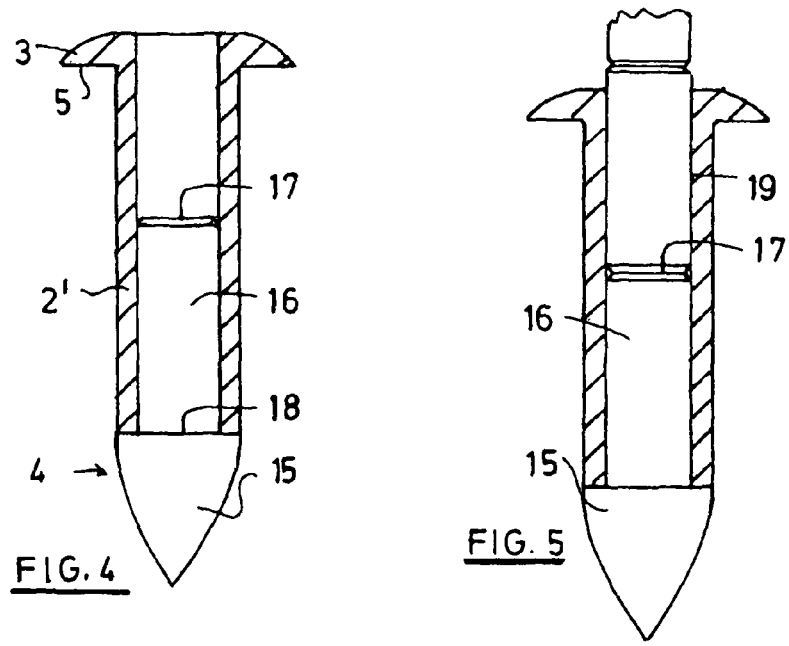
FIG. 4 A section of a two-part blind rivet.
FIG. 5 A section of a two-part blind rivet with an inserted rivet pin.

FIG. 5 shows the state in which the front end of a rivet pin 19 is connected to the contact place 17 of the shaft 16 of the component 15.

Figure 6:
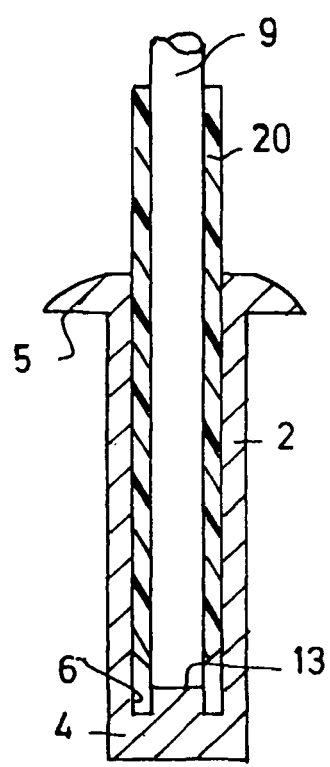
FIG. 6 A section corresponding to FIG. 5 with a rivet pin to be welded.

FIG. 6 shows an embodiment that is designed somewhat more precisely than the previous embodiments. A projection 13 is formed on the floor of the blind hole 6 of the rivet body 2 similar to the embodiment in FIG. 3. The rivet pin 9 that is connected to the contact place of the projection 13 has an insulation sleeve 20 or insulation layer at its front area that extends into the blind rivet. This ensures that current only flows between the face of the rivet pin 9 and the contact place of the projection 13 while welding. The insulation sleeve 20 insulates the rivet pin 9 from the remaining part of the rivet body 2, that is, from its inner walls. In this case, the insulating sleeve 20 is part of the rivet pin 9.

Figure 7:
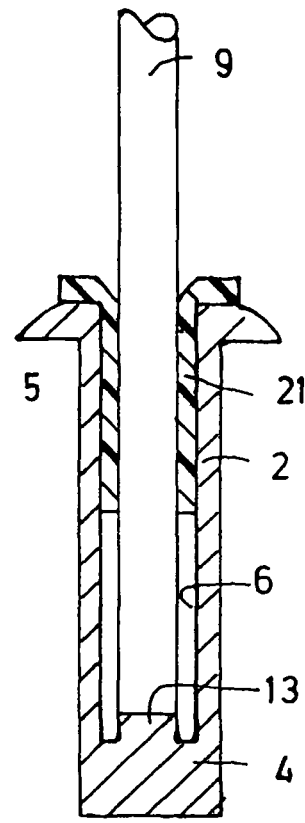
FIG. 7 A representation corresponding to FIG. 6.

FIG. 7 shows an embodiment in which an insulation sleeve 21 that is now assigned to the blind rivet is inserted in the rivet body designed as a sleeve. An uninsulated rivet pin 9 can thus be used, which can be welded to the projection 13. The insulating sleeve 21 only partially extends into the blind rivet, which is sufficient to center the rivet pin 9 and thereby maintain a distance from the inner walls of the blind hole 6 of the rivet pin 2.

Figure 8:
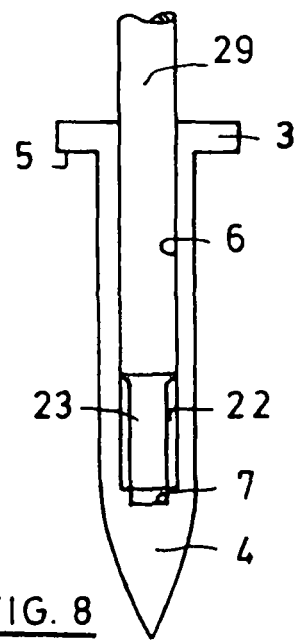
FIG. 8 A blind rivet having a rivet pin to be screwed.

In the previously described embodiments, it is assumed that the rivet pin 9 is welded as a pull element to the blind rivet. FIG. 8 schematically portrays a blind rivet that has an inner thread 22 in the area of the floor 7 of the setting end 4. The front end of the rivet pin 29 provided with an outer thread 23 is screwed into this inner thread. In this case, the rivet pin 29 can have an outer diameter that is only slightly smaller than the inner diameter of the blind hole 6 of the blind rivet. In this case, the rivet pin 29 can be guided by the blind hole 6 while being screwed into the thread 22.

Instead of a formed inner thread 22, it is also possible for the blind hole to have a smaller diameter here, in which the outer thread 23 of the rivet pin 29 cuts or forms a thread when it is screwed in.

Figures 9, 10:
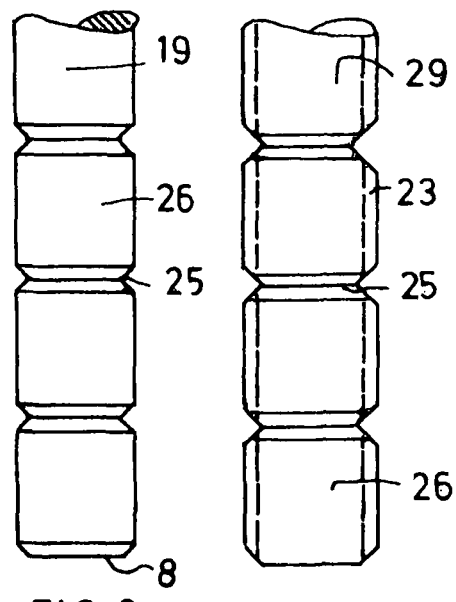
FIG. 9 Simplified side view of a rivet pin to be welded having individual sections.
FIG. 10 A representation corresponding to FIG. 9 of a rivet pin having a blind rivet for screwing.

FIG. 9 shows the side view of a rivet pin 19 that can be used, for example, in the embodiment of the blind rivet in FIG. 7. The rivet pin is divided by peripheral notches 25 into individual segments 26. When the front face 8 of the rivet pin 19 is welded to a projection 13 on the floor of the blind hole 6, pulling also occurs as before to form and thus to fasten the blind rivet. The rupture joints formed by the notches 25 must resist the arising tension. Once the blind rivet is completely fastened, the rivet pin 19 is disconnected at the next rupture joint that is formed by a notch 25. A segment 26 of the rivet pin 19 thereby remains contained in the blind rivet. This section can form a reinforcement of the rivet connection.

The embodiment with the rupture joints formed by the peripheral notches 25 for dividing the rivet pin into individual segments 26 can be created in a rivet pin 19 in FIG. 9 with a smooth outer surface, as well as in a rivet pin 29 (see FIG. 10) with an outer thread 23 on its outside. In the portrayed example, the notches 25 are deep enough for the thread to be completely interrupted at this location.

It is however also possible for the notches to be less deep and for the thread to be not completely interrupted. It is also possible for the notches not to be peripheral but rather only extend or be interrupted over part of the periphery.

FIG. 11 shows another embodiment of a rivet pin similar to the rivet pin 19 in FIG. 9, which, however, has an insulating sleeve 20 over its entire length. This insulating sleeve can be a plastic sleeve that is torn off when the front segment 26 is torn or sheared off.

FIG. 12 shows a simplified section of a rivet body 2 of a blind rivet similar to the embodiment in FIG. 3. On the floor 32 of the recess 6 in the rivet body 2, a cylindrical projection 13 is formed that forms the contact surface for the rivet pin 9, 29, 19. Outside of the projection 13, the floor 32 of the recess 6 rises slightly in the direction from the inner wall of the recess to the projection 13, wherein the angle 36 between the floor 32 and a perpendicular surface in the area is less than 45°.

The front side of the rivet body 2 is designed in the same manner as the face 10 in the embodiment in FIG. 2. Such a rivet body is suitable both for being inserted into an existing hole and for being shot.

FIG. 13 shows another embodiment in which the rivet body 2 forms an edge 34 in the area of its setting end 4, whereas the face 40 is recessed in relation to the plane on which the edge 34 lies.

Whereas the embodiments in FIGS. 1, 4, 5 and 8 have an actual tip, FIG. 14 now shows an embodiment in which the setting end 4 has an area in which the diameter narrows along a curved profile and a tip is not formed; instead, the front end forms a flattened face 41.

FIG. 15 shows an embodiment similar to the embodiments in FIGS. 4 and 5 in that the setting end 4 of this rivet body 2 is formed by a separate component 35. This separate component 35 has a single-piece projection 36 that is held within the rivet body 2 by the rivet body. Its inner end 37 forms the contact surface for the rivet pin. In this case as well, there could be a projection similar to the embodiments in FIG. 3, 12, 13 that serves as the contact surface for the rivet pin.

The different shapes of the floor 7, 12 and 32 of the recesses 6 in the rivet body 2, as well as the different shapes of the outside of the setting end, can be combined as desired depending on the preferred application.

In the embodiments in FIG. 15, where the setting end is also suitable for being shot similar to the embodiments in FIGS. 2 and 12, the outer diameter of the component 35 forming the setting end 4 can be slightly larger than the outer diameter of the rivet body 2.

Blind rivets of the portrayed and described type not only serve to fasten two elements such that a rivet head is formed on the opposite, blind site. They can also be used to lock an element in a blind hole where the pulling movement of the rivet pin can cause expansion and clamping to the side walls of the blind hole without having to form a rivet head. It is of course also conceivable for such an expansion of the front end of the rivet body to occur in such a blind hole to thereby form a rivet head within a blind hole.

The invention claimed is:

1. Method for setting a blind rivet having an essentially cylindrical rivet body and a flange running perpendicular to an axis of the rivet body that forms a contact surface spaced axially along the rivet body a distance from a setting end of the rivet, the method comprising:
   moving the rivet body into a member until the contact surface projecting radially in relation to the rivet body contacts a surface surrounding a hole formed on a first side of the member;
   after the rivet body is situated in the member, inserting and connecting a pull element to an interior portion of the rivet body either before or during setting of the rivet; and
   pulling on the pull element and expanding the setting end of the rivet body to contact a side of the member opposite the first side;
   wherein a rivet pin is used as the pull element; and
   further comprising disconnecting the rivet pin from the rivet body after the expansion of a front of the setting end of the rivet body; and
   wherein the outside of the rivet pin is designed to be smooth, except for a front engaging area and wherein the rivet pin does not include a cap or head of greater diameter than the diameter of the rivet pin.

2. Method according to claim 1, wherein a contact place for a pull element has a contact surface running perpendicular to the lengthwise axis of the rivet body.

3. Method according to claim 1, wherein a contact place for the pull element is located in a recess of the rivet body.

4. Method according to claim 1, wherein a contact place for the pull element is located within the rivet body designed as a sleeve.

5. Method according to claim 1, wherein the front of the setting end is a single-piece part of the rivet body.

6. Method according to claim 1, wherein the front of the setting end has a flat face that has an edge (14) forming a cutting edge.

7. Method according to claim 1, wherein the front setting end has a narrowing diameter.

8. Method according to claim 1, wherein the front setting end has an area providing at least one of a straight profile and a curved profile.

9. Method according to claim 1, wherein the front setting end is designed blunt, especially flattened.

10. Method according to claim 1, wherein the largest diameter of the front setting end is greater than the outer diameter of the rivet body.

11. Method for setting a blind rivet having an essentially cylindrical rivet body and a flange running perpendicular to an axis of the rivet body that forms a contact surface spaced axially along the rivet body a distance from a setting end of the rivet, the method comprising:
   moving the rivet body into a member until the contact surface projecting radially in relation to the rivet body contacts a surface surrounding a hole formed on a first side of the member;
   after the rivet body is situated in the member, inserting and connecting a pull element to an interior portion of the rivet body either before or during setting of the rivet; and
   pulling on the pull element and expanding the setting end of the rivet body to contact a side of the member opposite the first side;
   wherein a rivet pin is used as the pull element; and
   further comprising disconnecting the rivet pin from the rivet body after the expansion of a front of the setting end of the rivet body; and
   wherein the rivet pin has transverse rupture joints that divide the rivet pin into individual sections.

12. Method for setting a blind rivet having an essentially cylindrical rivet body and a flange running perpendicular to an axis of the rivet body that forms a contact surface spaced axially along the rivet body a distance from a setting end of the rivet, the method comprising:
- moving the rivet body into a member until the contact surface projecting radially in relation to the rivet body contacts a surface surrounding a hole formed on a first side of the member;
- after the rivet body is situated in the member, inserting and connecting a pull element to an interior portion of the rivet body either before or during setting of the rivet; and
- pulling on the pull element and expanding the setting end of the rivet body to contact a side of the member opposite the first side;
- wherein a rivet pin is used as the pull element; and
- wherein a projection rises from a floor in a recess in the interior portion of the rivet body and provides a contact place that is smaller than the surface of the floor of the recess in the interior portion of the rivet body.

13. Method according to claim 12, wherein the floor of the recess of the rivet body is flat outside of the projection.

14. Method according to claim 12, wherein the floor of the recess of the rivet body outside of the projection is designed to rise toward the projection.

15. Method for setting a blind rivet having an essentially cylindrical rivet body and a flange running perpendicular to an axis of the rivet body that forms a contact surface spaced axially along the rivet body a distance from a setting end of the rivet, the method comprising:
- moving the rivet body into a member until the contact surface projecting radially in relation to the rivet body contacts a surface surrounding a hole formed on a first side of the member;
- after the rivet body is situated in the member, inserting and connecting a pull element to an interior portion of the rivet body either before or during setting of the rivet; and
- pulling on the pull element and expanding the setting end of the rivet body to contact a side of the member opposite the first side;
- wherein a rivet pin is used as the pull element; and
- further comprising disconnecting the rivet pin from the rivet body after the expansion of a front of the setting end of the rivet body; and
- wherein the front setting end has a face that is designed hollow, and in particular has a face that is recessed in relation to a peripheral edge.

16. Method for setting a blind rivet having an essentially cylindrical rivet body and a flange running perpendicular to an axis of the rivet body that forms a contact surface spaced axially along the rivet body a distance from a setting end of the rivet, the method comprising:
- moving the rivet body into a member until the contact surface projecting radially in relation to the rivet both contacts a surface surrounding a hole formed on a first side of the member;
- after the rivet body is situated in the member, inserting and connecting a pull element to an interior portion of the rivet body either before or during setting of the rivet; and
- pulling on the pull element and expanding the setting end of the rivet body to contact a side of the member opposite the first side;
- wherein a rivet is used as the pull element; and
- further comprising disconnecting the rivet pin from the rivet body after the expansion of a front of the setting end of the rivet body; and
- wherein the rivet body designed as a sleeve has an insulating layer or insulating sleeve on its inner side facing the rivet pin.

* * * * *